June 21, 1949.　　G. M. KRIEGBAUM ET AL　　2,473,959
REEL DRIVE FOR PLANTERS
Filed Aug. 21, 1944　　2 Sheets-Sheet 1
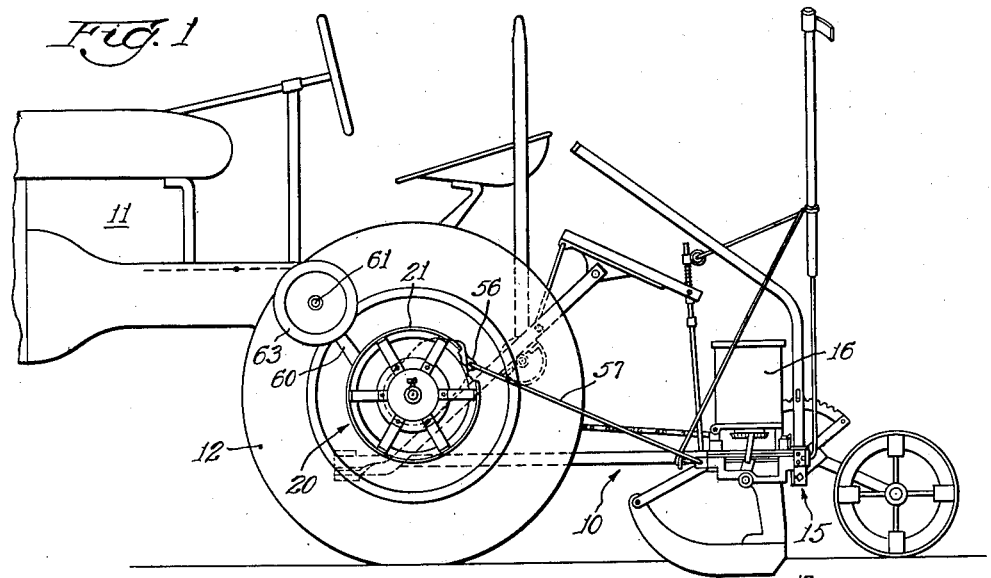
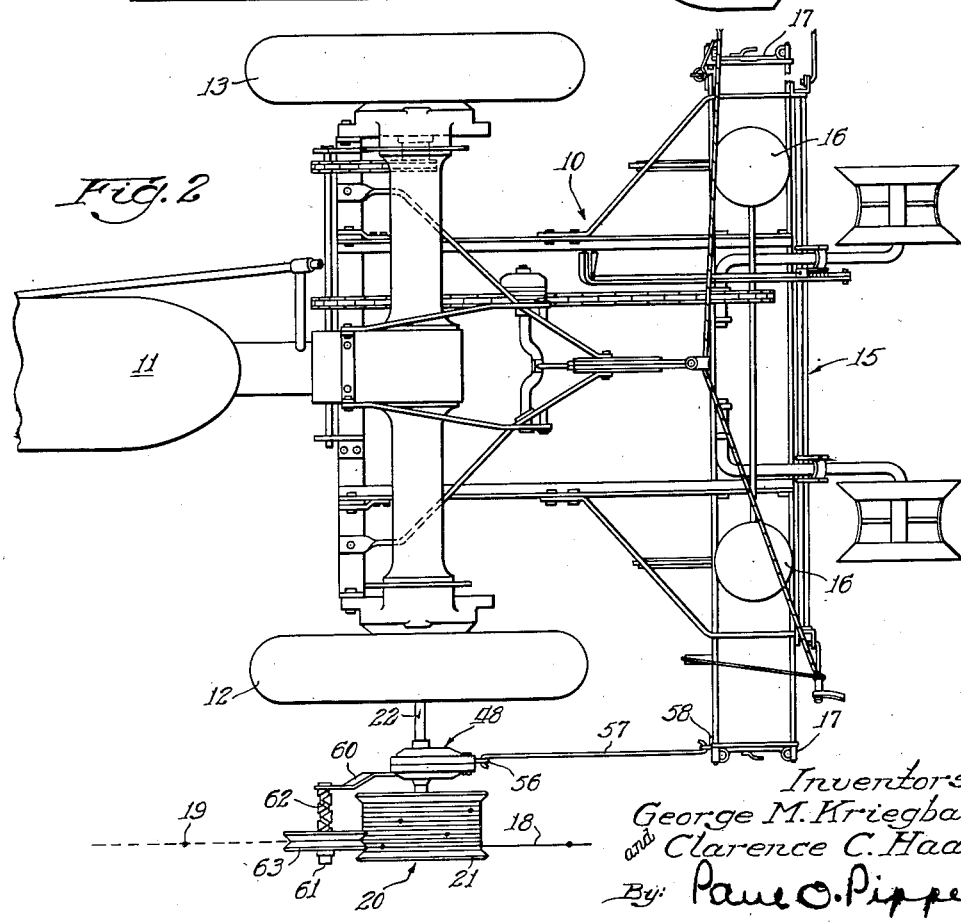
Inventors:
George M. Kriegbaum
and Clarence C. Haas
By: Paul O. Pippel
Atty.

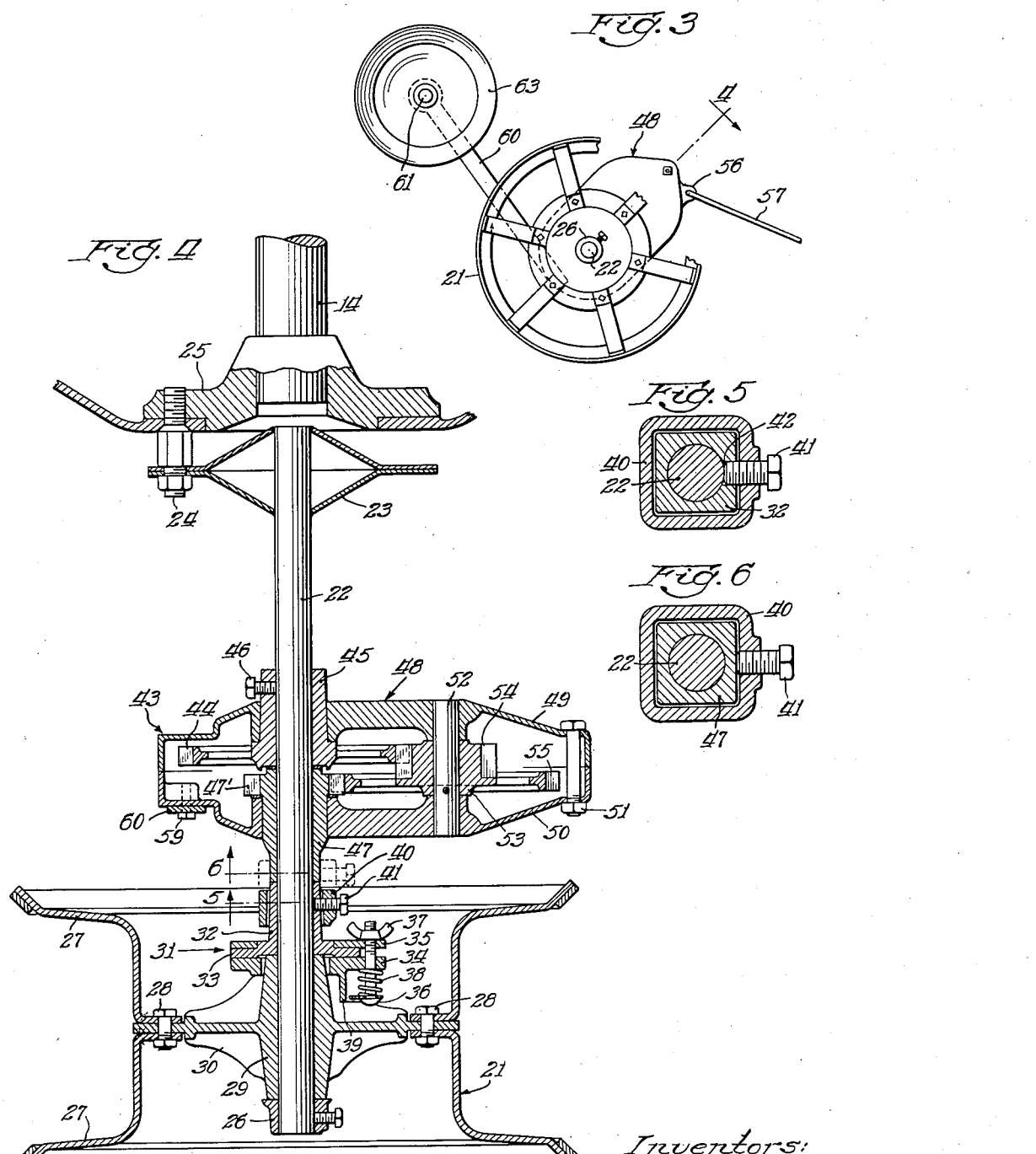

Patented June 21, 1949

2,473,959

UNITED STATES PATENT OFFICE 2,473,959

REEL DRIVE FOR PLANTERS

George M. Kriegbaum and Clarence C. Haas, Richmond, Ind., assignors to International Harvester Company, a corporation of New Jersey Application August 21, 1944, Serial No. 550,406

3 Claims. (Cl. 111—44)

This invention relates to check-row planters and the like, and particularly to reel drive mechanism therefor.

In tractor-mounted check-row planters, the reel from which the check-wire is dispensed at the beginning of a planting operation and upon which it is rewound at the completion of planting, is frequently mounted upon the body of the tractor between the front and rear wheels thereof. An objection to this has been that the reel interferes with the operator's view of the working area, and the tractor parts sometimes interfere with the proper winding of the check-wire.

An object of the present invention is to provide an improved reel drive for planters whereby the check-wire is uniformly wound on the reel and at a speed commensurate with the rate of travel of the tractor.

Another object is to provide an improved mounting for a check-wire reel upon a tractor or the like.

A further object is to provide means for mounting a check-wire reel to rotate coaxially with the tractor drive wheels, means for driving the reel at a peripheral speed commensurate with that of the drive wheel to promote uniform winding of the check-wire, and a slip clutch to compensate for the increasing rate of take-up of the check-wire.

A still further object is to provide means for mounting a check-wire reel to rotate coaxially with one of the drive wheels and at a location laterally outwardly removed therefrom.

Another object is to provide means for supporting a reel drive mechanism upon a ground-contacting wheel and for driving the reel from the ground wheel at a higher rotary speed than that of the ground wheel.

Other objects and advantages will become clear from the following detailed description when read in conjunction with the accompanying drawings, wherein:

Figure 1 is a view in side elevation of the rear end of a tractor, showing a check-row planter and the reel drive mechanism of the present invention;

Figure 2 is a plan view of the structure shown in Figure 1;

Figure 3 is an enlarged elevational detail, with parts removed for clarity, of the reel structure shown in Figure 1;

Figure 4 is an enlarged section taken on the line 4 of Figure 3;

Figure 5 is a section taken on the line 5 of Figure 4; and

Figure 6 is a section taken on the line 6 of Figure 4.

In the drawings, a check-row planter designated generally by the numeral 10, is shown attached to a tractor 11 having laterally spaced rear drive wheels 12 and 13 mounted upon a transverse axle 14.

Planter 10 includes a transverse frame 15 supporting planting mechanisms 16. The ends of the planter frame extend laterally beyond the drive wheels 12 and 13 of the tractor and are provided with check heads 17. It will be noted that the planter 10 is directly connected to the tractor to be supported thereby. However, the structural details thereof form no part of the present invention, and the planter is substantially the same as that shown in the patent to Kriegbaum et al. 2,171,034, dated August 29, 1939.

The mechanism by which check-row planters dispense seed is also well known and requires no detailed explanation here. It may be pointed out generally that a check-wire, such as is shown at 18 in the drawings, is laid out in a field and staked. The check-wire is then placed in one of the check heads 17, which is of conventional construction, and nubs such as 19, operate a conventional tripping mechanism, not shown, for the planters 16 in order to deposit seed at fixed intervals.

In this planting operation, the check-wire 18 is staked at opposite ends of the field and is laid out and subsequently wound up again by the reel mechanism generally indicated at 20. This mechanism includes a drum or reel 21, loosely mounted upon the outer end of a shaft 22, which extends transversely of the tractor. The inner end of shaft 22 is provided with an annular attaching plate 23 having openings therein to receive bolts 24, by which the plate is secured to the hub 25 of rear drive wheel 12, the shaft 22 being coaxial with axle 14, as clearly shown in Figure 4. Thus shaft 22 rotates with wheel 12 and at the same speed as axle 14. A collar 26 is keyed to the outer end of shaft 22 to prevent displacement of drum 21 therefrom.

The structure of drum 21 is conventional and consists generally of elements 27 secured together by bolts 28 and supported upon a hub 29 provided with radially extending ribs 30. Likewise mounted upon shaft 22, on the side of drum 21 opposite the collar 26, is a slip clutch 31 including a hub 32 having a flange portion 33 confined on opposite sides by clutch plates 34 and 35. Clutch plates 34 and 35 are resiliently held against the opposite faces of flange portion 33 by a bolt 36 adjustable by a wing nut 37 and having a spring 38 thereupon between the bolt head and the plate 34. Plate 34 is further provided with axially extending lugs 39, which are adapted to engage the ribs 30 of the drum 21.

The outer surface of hub 32 is square in cross-section, as indicated in Figure 5, and is surrounded by a loose collar 40 likewise square in cross-section, and having an inner surface conforming to and adapted to slide upon the hub portion 32. Collar 40 is provided with a key 41 adapted to be received in a radial opening 42 in the hub portion 32 and to bear against the shaft 22 to secure the slip clutch 31 thereto. With the parts in the position as indicated in Figures 4 and 5, with clutch 31 secured to shaft 22, the drum or reel 21 is utilized for laying out check-wire. In this position of the parts, the drum 21 is loose upon the shaft 22 so that check-wire may be freely dispensed therefrom, but tension is maintained upon the check-wire by the contact of lugs 39 of clutch plate 34 with the ribs 30 of the drum. Clutch plates 34 and 35 slide about the flange portion 33 as the drum 21 rotates and maintains the check-wire under proper tension. The check-wire is paid out from the reel 21 in the direction as indicated in solid lines in Figure 2.

As pointed out before, at completion of the planting operation the check-wire is rewound upon the reel or drum 21. In view of the difference in the diameter between reel 21 and drive wheels 12 and 13 of the tractor, it is clear that the peripheral speed of the minimum diameter of reel 21 must be stepped up considerably in order for the check-wire to be uniformly wound thereupon and at the speed at which the tractor is traveling. As already pointed out, shaft 22 of the reel mechanism 20 is mounted upon the tractor drive wheel 12 to rotate coaxially therewith. In order to drive the reel 21 at a peripheral speed commensurate with the rate of travel of the tractor, applicants provide a step-up mechanism generally indicated at 43. This mechanism includes a gear wheel 44 provided with a sleeve 45 keyed to the shaft 22 by a bolt 46. Loosely mounted upon the shaft 22 laterally outwardly from gear wheel 44 is a sleeve 47 having secured thereto a pinion 47' of smaller diameter than the gear wheel 44. Journaled upon sleeve 47 and hub 45 is a gear box 48 comprising separable portions 49 and 50 connected by bolts 51. Journaled in the portions 49 and 50 is a shaft 52 parallel to shaft 22 and having keyed thereto a step gear 53 comprising a smaller step 54 and a larger step 55. Step 54 is in driving engagement with gear 44 secured to shaft 22, and step 55 is in engagement with pinion 47' on sleeve 47. Thus, since gear 44 is secured to shaft 22 and pinion 47' on sleeve 47 is loose upon shaft 22, rotation of shaft 22 is transmitted from gear 44 through step gear 53 to pinion 47', the ratio being approximately three revolutions of pinion 47' for one revolution of shaft 22.

Sleeve 47 is likewise provided with an outer surface of substantially square cross-section, as clearly shown in Figure 6, and adapted to coincide with the square outer surface of hub portion 32 of slip clutch 31. As already stated, when unwinding wire from reel 21, the reel is free to rotate upon the shaft 22 against the resistance imposed thereupon by its connection with the slip clutch 31. In order to drive reel 21 and at a higher rotary speed than that of shaft 22, key 41 is unscrewed from its seat in hub portion 32. The collar is then slid along the hub 32 and the square portion of sleeve 47 to the position shown in dotted lines in Figure 4 and in cross-section in Figure 6. The key or bolt 41 is then tightened when collar 40 straddles the hub portion 32 and sleeve 47, thus connecting these two elements. Drive from axle 14, wheel 12, and shaft 22 is then transmitted through gears 44, 53, and 47' to the slip clutch 31, reel 21 being driven therewith by contact of lugs 39 with ribs 30. In order to maintain the check-wire at constant tension when being wound upon the reel 21, the peripheral speed of the smallest diameter of the reel is preferably slightly greater than the peripheral speed of wheel 12 and therefore of the ground travel of the tractor. As the check-wire is wound upon the reel, as indicated in dotted lines in Figures 1 and 2, the speed of take-up of the check-wire increases with the increasing diameter of the reel, and the slip clutch 31 compensates by slippage in order to maintain a constant tension on the wire. In order to prevent rocking of the gear box 48 with the rotation of shaft 22, a lug 56 is provided adjacent the upper end of the gear box (see Figures 1, 2, and 3) and connected by a rod 57 with a lug 58 adjacent the left-hand check head 17 at the end of frame 15. While in the present embodiment gears have been shown and described for the step-up drive, it should be understood that other suitable driving mechanism may be substituted therefor.

Secured to the lower portion of gear box 48 by a bolt 59 is a forwardly extending strap 60, to the end of which is secured a transverse axle 61 having crossed grooves 62 therein and parallel to shaft 22. Mounted upon shaft 61 for reciprocation thereon in the grooves 62 is a sheave 63. In winding the check-wire 18 upon the reel 21, as indicated by the dotted lines in Figures 1 and 2, the check-wire is passed over the sheave 63 and under and around the reel 21. The sheave 63, reciprocating along the axle 61 by virtue of the grooves 62, serves to level-wind the check-wire upon the reel.

It should now be understood that a novel and efficient reel drive for a check-row planter has been provided, the advantages of which are manifold. For example, since the reel and its drive mechanism extend laterally outwardly from the tractor drive wheels, they are out of the way and do not obstruct the vision of the operator. Further, the novel mounting thereof upon the tractor drive wheel simplifies the operation thereof, and only a simple adjustment is necessary to change the function of the device from that of unwinding check-wire at the beginning of a planting operation to the rewinding of the wire at the completion thereof.

In the embodiment of the invention shown in the drawings, the shaft 22 with the reel and step-up drive mechanism is mounted on the left-hand tractor drive wheel 12. In such instances, of course, the check-wire will be laid at the edge of the field adjacent the left-hand side of the tractor. However, it should be clear that if the right-hand side of the tractor is to operate at the edge of a field or adjacent a fence or the like, the drive mechanism 20 may be readily detached from wheel 12 and similarly attached to wheel 13 on the right side of the tractor.

Having described the invention, it should be understood that modifications may be made therein without departing from the spirit of the invention or the scope of the appended claims.

What is claimed is:

1. In combination with a tractor having a longitudinally extending body, a transverse rear axle and rear drive wheels, a reel drive mechanism for a planter comprising a transverse shaft mounted for coaxial rotation with said rear axle, a check-wire reel loosely mounted adjacent the free end of said shaft, a sleeve secured to said shaft, a second sleeve loose on said shaft, gears on said sleeves, a casing journaled on said sleeves, gearing carried by said casing and meshing with the gears on said sleeves for rotating said second sleeve at a higher rotary speed than said shaft, and means for optionally drivingly connecting said second sleeve and said reel.

2. In combination with a tractor having a longitudinally extending body, a transverse rear axle and rear drive wheels, a reel drive mechanism for a planter comprising a transverse shaft mounted for coaxial rotation with said rear axle, a check-wire reel loosely mounted adjacent the free end of said shaft, a gear secured to said shaft, a sleeve loose on said shaft, a gear secured to said sleeve, a casing journaled for rotation on said shaft, gearing carried by said casing and meshing with the gears on said shaft and said sleeve for rotating the sleeve at a higher rotary speed than the shaft, and means for drivingly connecting said sleeve and said reel.

3. For use with a tractor having a transverse rear axle and rear drive wheels, a planter having a transverse frame extending laterally outwardly beyond said drive wheels, a transverse shaft detachably secured at one end to one of said drive wheels for coaxial rotation therewith, a check-wire reel freely rotatable on said shaft adjacent its outer end, a gear housing journaled on said shaft in substantially longitudinal alinement with the end of said planter frame, gearing on said shaft, step-up gearing in said housing meshing with the gearing on said shaft, pinion means on said shaft drivingly connecting said step-up gearing and said reel, means for optionally disabling the driving connection between said gearing and said reel, and means connecting said gear housing with said planter frame to prevent rocking movement of said housing.

GEORGE M. KRIEGBAUM.
CLARENCE C. HAAS.

REFERENCES CITED

The following references are of record in the file of this patent:

UNITED STATES PATENTS

| Number | Name | Date |
|---|---|---|
| 210,998 | Cross | Dec. 17, 1878 |
| 265,197 | Waterman | Sept. 26, 1882 |
| 315,790 | James et al. | Apr. 14, 1885 |
| 808,424 | Wyckoff et al. | Dec. 26, 1905 |
| 939,616 | Murphey | Nov. 9, 1909 |
| 1,058,694 | Bartholomew | Apr. 8, 1913 |
| 1,892,785 | Keiser | Jan. 3, 1933 |
| 1,976,314 | White | Oct. 9, 1934 |
| 2,033,366 | White | Mar. 10, 1936 |
| 2,108,367 | Christian | Feb. 15, 1938 |
| 2,171,034 | Kriegbaum et al. | Aug. 29, 1939 |